US009524323B2

(12) United States Patent
Meek et al.

(10) Patent No.: US 9,524,323 B2
(45) Date of Patent: Dec. 20, 2016

(54) DELEGATION OF EXPRESSION TREE EVALUATION

(75) Inventors: Colin Joseph Meek, Kirkland, WA (US); Bart J. F. De Smet, Bellevue, WA (US); Henricus Johannes Maria Meijer, Mercer Island, WA (US); Alexander Douglas James, Sammamish, WA (US); Balan Sethu Raman, Redmond, WA (US); Rafael de Jesús Fernández Moctezuma, Kirkland, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 800 days.

(21) Appl. No.: 13/603,966

(22) Filed: Sep. 5, 2012

(65) Prior Publication Data

US 2014/0067871 A1    Mar. 6, 2014

(51) Int. Cl.
*G06F 17/30* (2006.01)
*G06F 17/22* (2006.01)
*G06F 9/45* (2006.01)

(52) U.S. Cl.
CPC ......... *G06F 17/30569* (2013.01); *G06F 8/427* (2013.01); *G06F 8/43* (2013.01); *G06F 17/227* (2013.01)

(58) Field of Classification Search
CPC .......................... G06F 17/30569; G06F 17/227
See application file for complete search history.

(56) References Cited

U.S. PATENT DOCUMENTS

| 6,980,985 | B1 * | 12/2005 | Amer-Yahia et al. | |
| 7,363,628 | B2 | 4/2008 | Shukla et al. | |
| 7,467,371 | B1 | 12/2008 | Meredith et al. | |
| 7,647,298 | B2 | 1/2010 | Adya et al. | |
| 2007/0250470 | A1 * | 10/2007 | Duffy et al. | 707/2 |
| 2008/0115195 | A1 | 5/2008 | Malek et al. | |
| 2009/0171887 | A1 * | 7/2009 | Love et al. | 707/2 |

(Continued)

OTHER PUBLICATIONS

Grust, et al., "Avalanche-Safe LINQ Compilation", In Proceedings of the Very Large Database Endowment, vol. 3, Issue 1, Sep. 2010, 11 pages.

(Continued)

*Primary Examiner* — Alicia Willoughby
(74) *Attorney, Agent, or Firm* — Nicholas Chen; Kate Drakos; Micky Minhas (57) ABSTRACT

Evaluating an expression tree. A method includes, at a first domain, accessing an expression tree. The expression tree comprises a plurality of nested expressions. The plurality of nested expressions spans a plurality of domains. The expressions in the expression tree are expressed in a common format in spite of the different expressions of the expression tree being intended to be evaluated by different domains. At the first domain, the method includes evaluating one or more references to local variables included in the plurality of nested expressions. The method further includes determining that one or more expressions in the plurality of expressions are to be evaluated by a different domain. The method further includes expanding the one or more expressions in the plurality of expressions to be evaluated by different domains to allow the one or more expressions to be evaluated by the different domain.

20 Claims, 6 Drawing Sheets

(56) References Cited

U.S. PATENT DOCUMENTS

2009/0328013 A1 12/2009 Aharoni et al.
2010/0145946 A1* 6/2010 Conrad et al. ............... 707/736
2011/0252360 A1 10/2011 Wheeler et al.

OTHER PUBLICATIONS

Isard, et al., "Distributed Data-Parallel Computing Using a High-Level Programming Language", In Proceedings of the 35th SIGMOD International Conference on Management of Data, Jun. 29, 2009, 7 pages.

* cited by examiner

DELEGATION OF EXPRESSION TREE EVALUATION

BACKGROUND

Background and Relevant Art

Computers and computing systems have affected nearly every aspect of modern living. Computers are generally involved in work, recreation, healthcare, transportation, entertainment, household management, etc.

Further, computing system functionality can be enhanced by a computing systems ability to be interconnected to other computing systems via network connections. Network connections may include, but are not limited to, connections via wired or wireless Ethernet, cellular connections, or even computer to computer connections through serial, parallel, USB, or other connections. The connections allow a computing system to access services at other computing systems and to quickly and efficiently receive application data from other computing system.

Often different systems have different communication protocols for similar functions. For example, an application at a first system may have a particular protocol that it uses to request data from a data store. However, data stores at other systems that are connected to the first system may have data stores that do not communicate well (or at all) with the particular protocol. For example, each of the data stores may have their own protocol which they expect to be used when communicating with a particular data store.

The subject matter claimed herein is not limited to embodiments that solve any disadvantages or that operate only in environments such as those described above. Rather, this background is only provided to illustrate one exemplary technology area where some embodiments described herein may be practiced.

BRIEF SUMMARY

One embodiment illustrated herein includes a method that may be practiced in a computing environment. The method includes acts for evaluating an expression tree. The method includes, at a first domain, accessing an expression tree. The expression tree comprises a plurality of nested expressions. The plurality of nested expressions spans a plurality of domains. The expressions in the expression tree are expressed in a common format in spite of the different expressions of the expression tree being intended to be evaluated by different domains. At the first domain, the method includes evaluating one or more references to local variables included in the plurality of nested expressions. The method further includes determining that one or more expressions in the plurality of expressions are to be evaluated by a different domain. The method further includes expanding the one or more expressions in the plurality of expressions to be evaluated by different domains to allow the one or more expressions to be evaluated by the different domain.

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

Additional features and advantages will be set forth in the description which follows, and in part will be obvious from the description, or may be learned by the practice of the teachings herein. Features and advantages of the invention may be realized and obtained by means of the instruments and combinations particularly pointed out in the appended claims. Features of the present invention will become more fully apparent from the following description and appended claims, or may be learned by the practice of the invention as set forth hereinafter.

BRIEF DESCRIPTION OF THE DRAWINGS

In order to describe the manner in which the above-recited and other advantages and features can be obtained, a more particular description of the subject matter briefly described above will be rendered by reference to specific embodiments which are illustrated in the appended drawings. Understanding that these drawings depict only typical embodiments and are not therefore to be considered to be limiting in scope, embodiments will be described and explained with additional specificity and detail through the use of the accompanying drawings in which.

DETAILED DESCRIPTION

Embodiments may enable composite workflows, in which data is made available to a system from multiple sources, to query over various dialects of a data query component (such as various dialects of LINQ available from Microsoft® Corporation of Redmond Wash.) in client/server settings.

Previous approaches to making data available across systems may have included using shared memory locations or intermediary stores from resulting computations of a particular query under one dialect. However, such approaches may not be desirable for client-server workflows. Such approaches may also result in more than one unit of computation.

Some embodiments described herein enable composition of an expression tree across multiple dialects of a data query component using a common format in spite of the multiple dialects, resulting in a single manageable computational unit. The user is empowered to move back and forth from the data query component dialects by clearly delineating the boundaries, so that the appropriate APIs are exposed in every relevant stage of the computation.

In particular, embodiments may allow for creating and evaluating expression trees where the expression trees include a number of nested expressions. The nested expressions span, and are evaluated by, a number of different domains, but are nonetheless expressed in a common format readable by a single interpreter.

Figure 1:
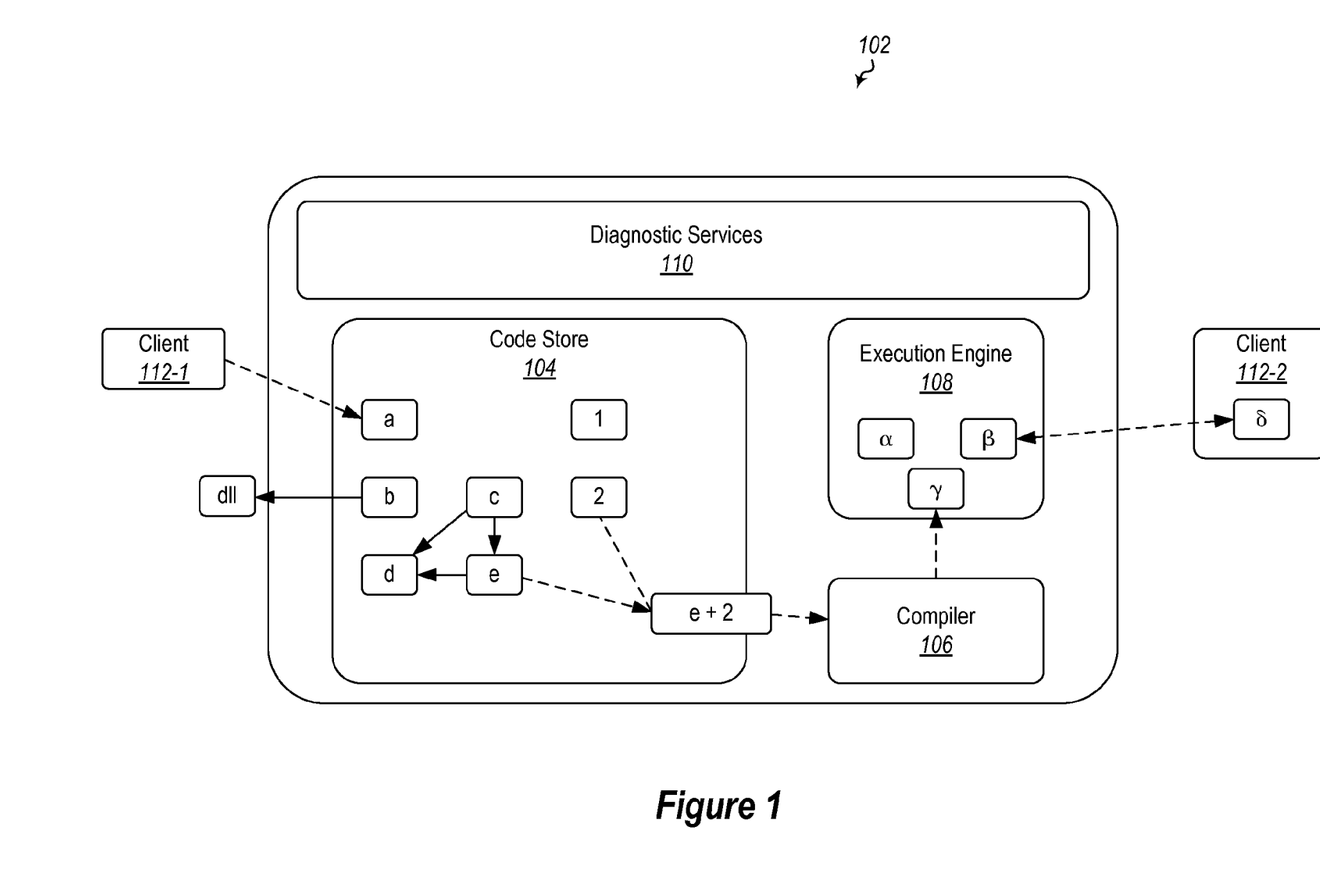
FIG. 1 illustrates a server.

The domains illustrated herein could be delineated in any of a number of different fashions. For example, in some embodiments different domains are delineated by having different semantics. The different semantics require clear delineation of where hand-off of expression evaluation occurs. For example, embodiments may carve out an "island" for evaluation by another party. Different domains may be defined by remoting boundaries. These could be another instance of the same evaluator but running elsewhere (e.g. out of process, on another machine, etc.). General mechanisms of delineating domains could also be used for partial tree rewrites, limiting the scope of such a transformation. Referring now to FIGS. 1-9 an example is illustrated of a client server model. FIG. 1 illustrates a server 102. The server includes a code store 104. Code stored in the code store 104 can serve different purposes. For example, it can deal with data generation, data ingress, data manipulation, and/or data egress.

Code from the code store can be composed in a way to turn it into computations. As illustrated in FIG. 1, this can be performed by a compiler 106 at the server 102. The resulting computation can be executed by an execution engine 108 at the server 102.

Embodiments may include one or more diagnostic services 110 that can be used to monitor and manage assets and entities. FIG. 1 further illustrates a plurality of clients 112-1 and 112-2. Clients are referred to herein generically as 112 while specific examples are shown with appended numerals. Clients may include functionality for managing assets. For example, a client may manage assets to perform deployment functionality such as is illustrated by the interaction of client 112-1 with the server 102. Further, clients themselves may be running a computation. The computation being run by the client can communicate with a server computation, such as is illustrated by the client 112-2 interacting with the server execution engine 108. For example, the client may perform filtering functionality directly at the client 112.

Figure 2:
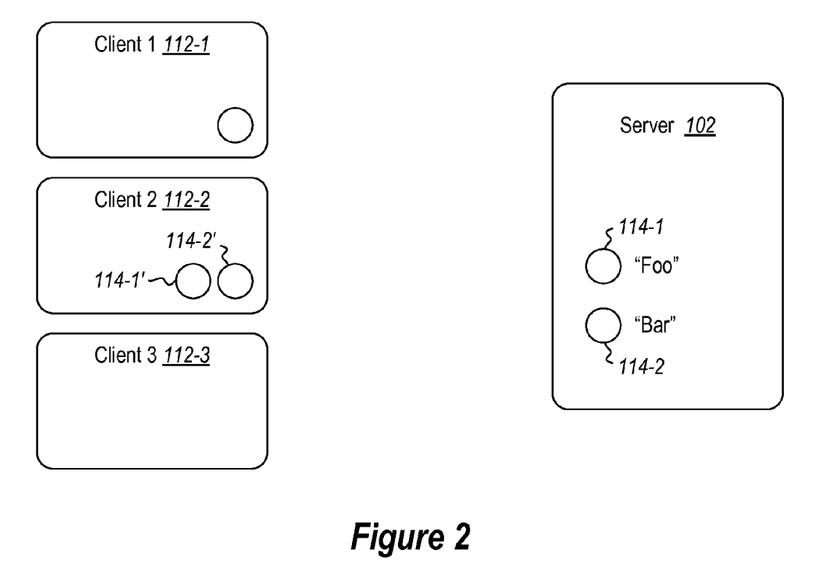
FIG. 2 illustrates client interaction with a server.

With reference now to FIG. 2, an illustrative workflow is illustrated. A user at a client 112 can interact with an entity whose evaluation can only be done by the server 102. Types can be returned to the client 112 to inform the user of this capability. In FIG. 2, three clients 112-1, 112-2 and 112-3 and a server 102 are shown. Two named entities 114-1 and 114-2 are deployed at the server 102. Client 112-2 has local handles 114-1' and 114-2' (i.e. proxy) on the two named entities 114-1 and 114-2.

A client can "define" an entity locally with the intention of hosting it in the server at a later time. A user may want to do this as a bootstrapping step. The user may define, for example, a source on top of which they wish to compose some logic. When the user defines a remote entity, the user essentially creates a remote type, as illustrated in FIG. 3.

Some embodiments are illustrated in the context of StreamInsight, an event processing platform available from Microsoft Corporation of Redmond Wash. Some embodiments use existing pull and push contracts defined in various frameworks, such as both the .NET Framework and the Reactive Framework available from Microsoft Corporation of Redmond Wash. Theses existing contracts use the following methods: IEnumerable and IObservable. The IEnumerable method exposes the enumerator, which supports a simple iteration over a non-generic collection. The IObservable method defines a provider for a push-based notification.

Suppose embodiments want to make an observable sequence available as a data source. To define an observable data source, a developer could write: IQbservable<int> source=app.DefineObservable(( )=>Observable.Range(0, 10)); DefineEnumerable, DefineObservable, and DefineStreamable are the methods used to define expressions intended to be evaluated by the server.

Figure 3:
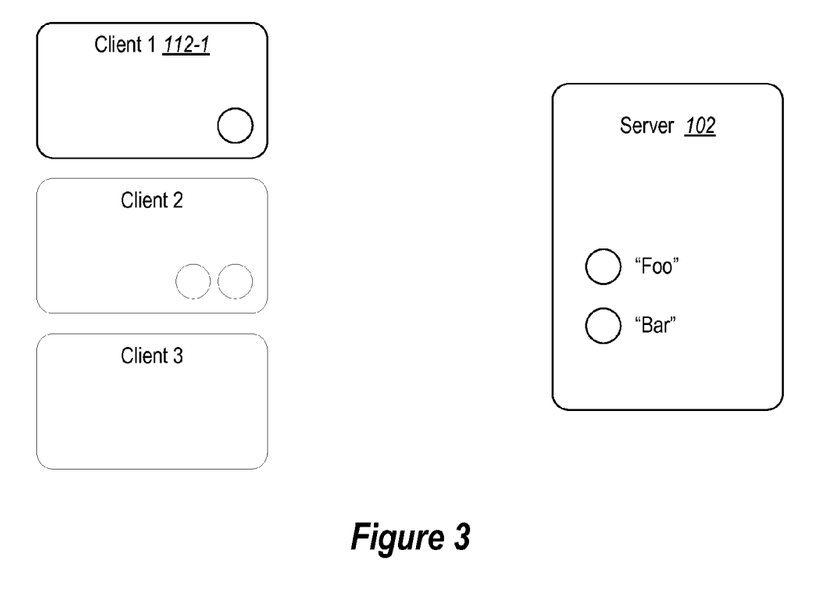
FIG. 3 illustrates client interaction with a server.
Figure 4:
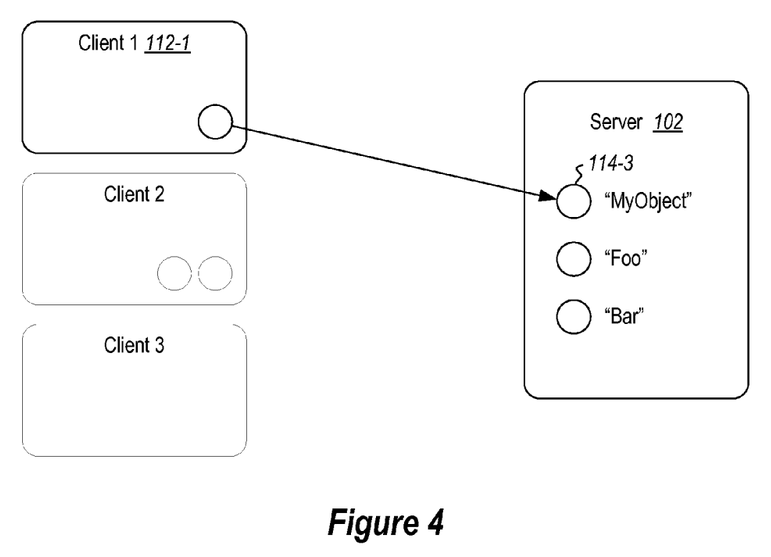
FIG. 4 illustrates client interaction with a server.
Figure 5:
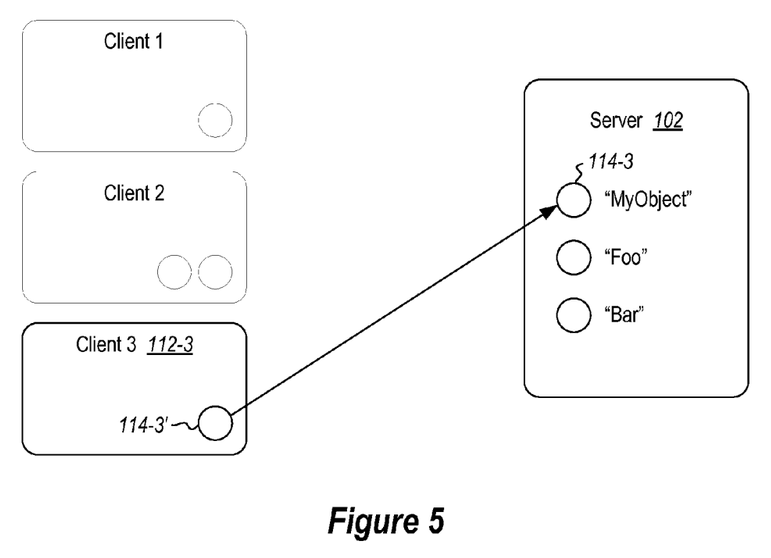
FIG. 5 illustrates client interaction with a server.

FIG. 3 illustrates defining new entities. The client 112-1 defines an entity 114-3 intended to be evaluated by the server 102. A client can deploy a composed entity to the server, as shown in FIG. 4, where the client 112-deploys the entity 114-3 to the server 102. The act of deploying an entity includes naming it, which facilitates its future management and discovery. To deploy the previously created source and name it, a developer could write the following code: source.Deploy("MyObject");

In FIG. 5, client 112-3 "gets" a handle 114-3' on the previously deployed entity 114-3 named "MyObject". Client 112-1 and client 112-3 can both have handles on the same entity and continue designing new entities in their respective contexts. From client 112-3, embodiments can obtain a proxy for the "MyObject" source by writing:
    var mySourceInClient3=app.GetObservable<int>("MyObject");

The user can distinguish a local resource, such as an observable, from a resource that is re-targeted by a data query component provider (in the illustrated example, a LINQ provider) by the type. For example, the type of MySourceInClient3 is Microsoft.ComplexEventProcessing.Linq.IRemoteObserver<int>.

Figure 6:
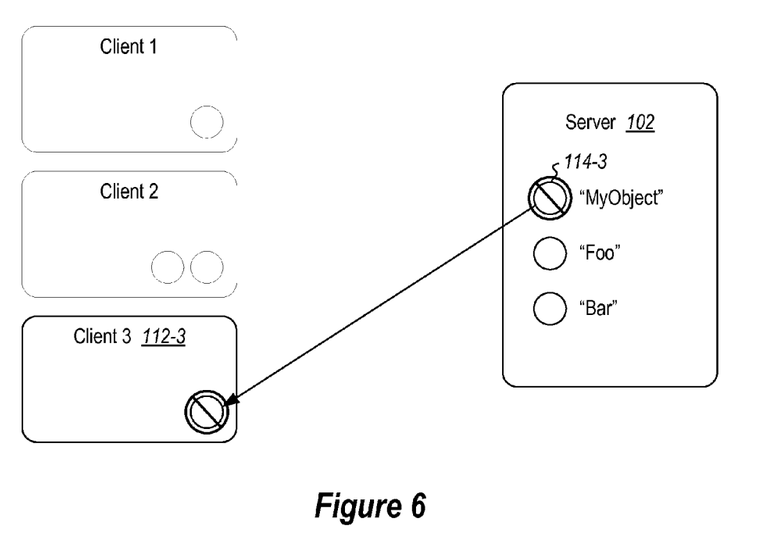
FIG. 6 illustrates client interaction with a server.
Figure 7:
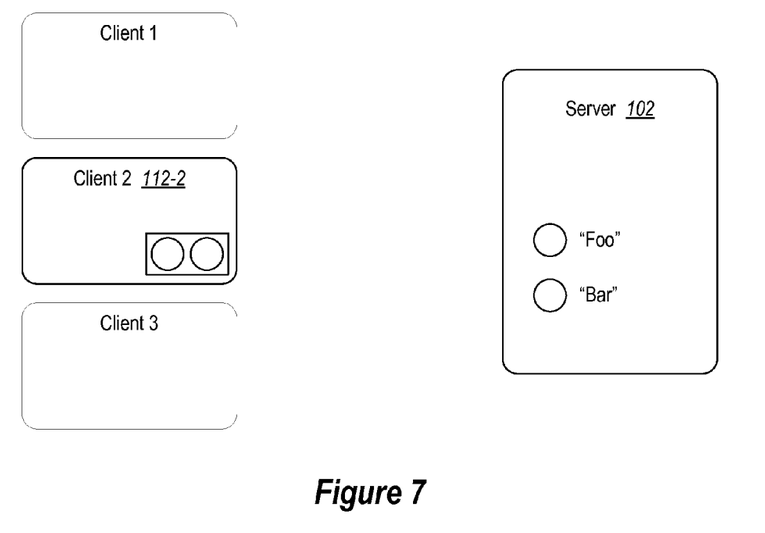
FIG. 7 illustrates client interaction with a server.
Figure 8:
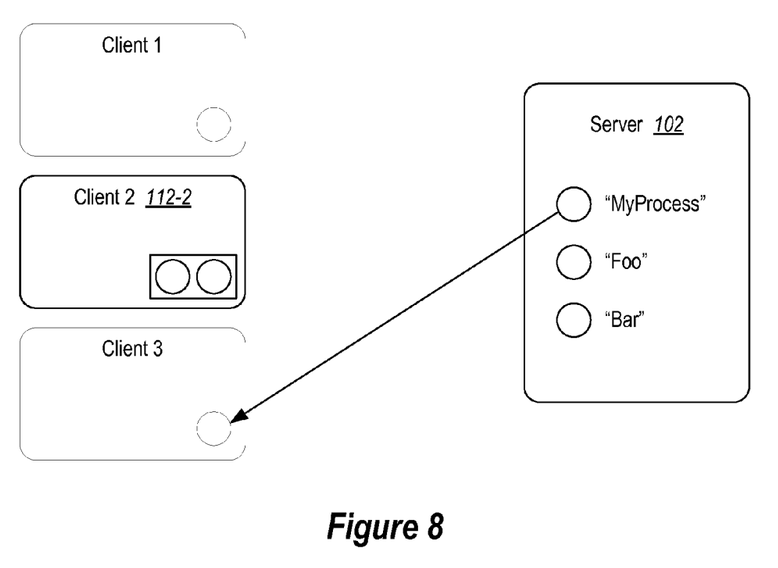
FIG. 8 illustrates client interaction with a server.

Entities can also be deleted, as shown in FIG. 6. In this example, client 112-3 has instructed the server to delete "MyObject" (i.e. deployed entity 114-3). If there are no discoverable references or dependencies on this entity 114-3 in the server 102, the server 102 can delete the entity 114-3. In this example, client 112-1 still had a handle 114-1' on that entity 114-1, and will likely fail upon attempting to deploy a dependent entity. Client 112-1 will be informed of which entity is no longer available. In the illustrated example, client 112-3 can delete the source it obtained previously by simply writing
    app. Entities ["MyObject"].Delete( );

A binding references existing components and is created by the client (as shown in FIG. 7.) Running a binding creates a running process, as illustrated in FIG. 8. Processes have an identity, and during deployment, a user can specify the process' name.

It is also possible to combine entities which are run in the server 102 with entities that run exclusively at the client 112 in a single process. This is achieved via what is referred to herein as "remoting". FIG. 7 provides an intuition of the remoting capabilities. In particular, FIG. 7 illustrates client 112-3 binds a source and a sink into a single, deployable entity.

Figure 9:
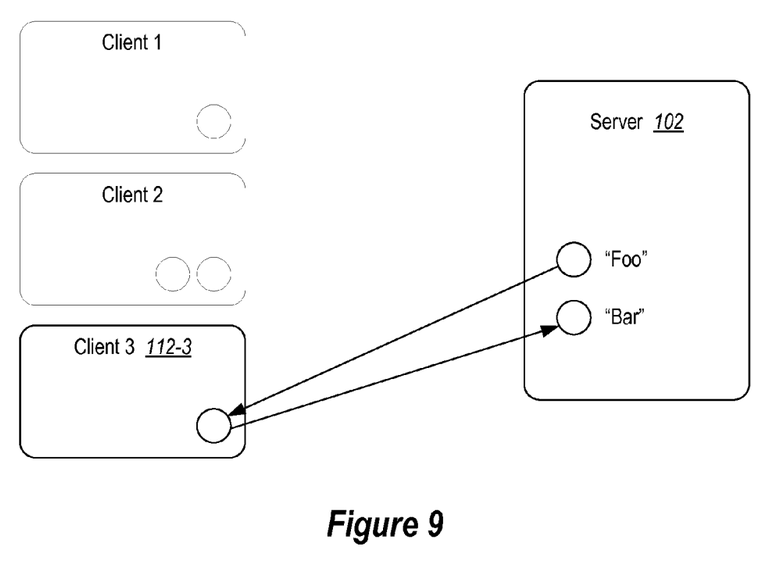
FIG. 9 illustrates client interaction with a server.

FIG. 8 illustrates deployment of a binding to create a process. FIG. 9 illustrates the remotable feature. The server 102 and client 112-3 both own executable pieces which talk to each other.

Some embodiments may implement a strongly-typed composite workflow expression mechanism, in which novel notions (such as a "remote binding") enable users to define execution across diverse compute stores within the same type system. The mechanism exploits a detection pattern to analyze the computational expressions and evaluate subexpressions belonging to foreign compute systems, leaving the rest of a tree un-evaluated until explicitly called.

Embodiments may implement a "code store" system such as the one illustrated above. In the examples illustrated herein, specialized actions (illustrated herein as "define", "deploy", and "get") enable clients to ship logic for later evaluation in a different environment.

In some embodiments, an algorithm accesses an expression graph, uses lambda expressions to encapsulate directed acyclic graphs (DAGs) in a tree, and results in an executable tree where common subexpressions have been matched. A lambda expression is an anonymous function that can contain expressions and statements, and can be used to create delegates or expression tree types. As used herein, lambda expressions are illustrated using the lambda operator "=>", which is read as "goes to". The left side of the lambda operator specifies the input parameters (if any) and the right side holds the expression or statement block. For instance, the lambda expression x=>x*x is read "x goes to x times x."

As used herein, a "source" is a data generator. Typically, there two classes of sources: sequence sources and temporal sources. In the illustrated examples directed to the StreamInsight and .Net Framework examples, a sequence source implements either the IEnumerable interface or the IObservable interface. A temporal source implements IStreamable, a new type in the .Net Framework which logically represents a temporal stream In the illustrated example, a sequence source can be processed using the Rx LINQ dialect or LINQ-to-Objects. A temporal source can be processed using StreamInsight's LINQ.

To support composition of queries over sequences and temporal streams, embodiments expose implementations of the IQueryable, IQbservable and IQStreamable specializations of source types. IQStreamable is a new type that represents a queryable temporal stream. These interfaces are defined in the System.Linq, System.Reactive.Linq and Microsoft.ComplexEventProcessing.Linq namespaces respectively. As used herein "Q" specialization simply indicates that a sequence or temporal stream is queryable.

Note, one cannot directly query an IStreamable, IEnumerable, or IObservable, as the types are not expressive. This is why the "Queryable" (Q) types exist.

A "sink" is a data consumer. A sink, in the illustrated examples using StreamInsight and, .Net Framework may be: (1) an observer to an IObservable source, or (2) a StreamInsight output adapter over an IStreamable.

Due to the nature of the IEnumerable contract, in which a consumer (enumerator) is obtained directly from the enumerable, in the present example, there is no concept of an Enumerator sink.

A "subject" is both a data producer and consumer. It serves the purpose of sharing computation and state across multiple producers/consumers. In the illustrated examples using StreamInsight and .Net Framework, a subject implements both the IObservable and IObserver interfaces, enabling it to both subscribe to observable sources and accept observer subscriptions.

Notice there is no "IStreamable subject". Such a construct might require defining and expressing semantics for arbitrary system-time dynamic union over temporal streams. Such an operator might need to reconcile application time with system time in the context of producers appearing and disappearing at random. Moreover, the precise semantics of temporal reconciliation might need to be encapsulated in said operator.

A "binding" is an executable composition over sources, sinks, or subjects. A "process" is a named execution of a binding.

Define, Deploy, and Get are defined for permutations of:
Pull-sequence (IEnumerable< >), push-sequence (IObservable< >), temporal stream (CepStream< >)
Source, sink
Parameterized, non-parameterized
Overloads are defined on the Microsoft.ComplexEventProcessing.Linq.RemoteProvider class:
The following now illustrates various definitions for the components of the specific examples illustrated herein.

Enumerable Source

```
public static class RemoteProvider
{
    public static IQueryable<TElement> DefineEnumerable<TElement>(
        this IRemoteProvider provider,
        Expression<Func<IEnumerable<TElement>>> definition);
    public static IQueryable<TElement> GetEnumerable<TElement>(
        this IRemoteProvider provider,
        string id)
    public static IQueryable<TElement> Deploy<TElement>(
        this IQueryable<TElement> definition,
        string id)
    public static Func<T1, IQueryable<TElement>>
DefineEnumerable<T1, TElement>(
        this IRemoteProvider provider,
        Expression<Func<T1, IEnumerable<TElement>>> definition)
    public static Func<T1, IQueryable<TElement>> GetEnumerable<T1, TElement>(
        this IRemoteProvider provider,
        string id)
    public static Func<T1, IQueryable<TElement>> Deploy<T1, TElement>(
        this Func<T1, IQueryable<TElement>> definition,
        string id)
// ... overloads for up to 16 parameters
```

Observable Source

```
public static IQbservable<TElement> DefineObservable<TElement>(
    this IRemoteProvider provider,
    Expression<Func<IObservable<TElement>>> definition)
public static IQbservable<TElement> GetObservable<TElement>(
    this IRemoteProvider provider,
    string id)
public static IQbservable<TElement> Deploy<TElement>(
    this IQbservable<TElement> definition,
    string id)
public static Func<T1, IQbservable<TElement>>
DefineObservable<T1, TElement>(
    this IRemoteProvider provider,
    Expression<Func<T1, IObservable<TElement>>> definition)
public static Func<T1, IQbservable<TElement>> GetObservable<T1, TElement>(
    this IRemoteProvider provider,
    string id)
public static Func<T1, IQbservable<TElement>> Deploy<T1, TElement>(
    this Func<T1, IQbservable<TElement>> definition,
    string id)
// ... overloads for up to 16 parameters
```

Observer Sink

```
public static IRemoteObserver<TElement>
DefineObserver<TElement>(
    this IRemoteProvider provider,
    Expression<Func<IObserver<TElement>>> definition)
public static IRemoteObserver<TElement> GetObserver<TElement>(
    this IRemoteProvider provider,
    string id)
public static IRemoteObserver<TElement> Deploy<TElement>(
    this IRemoteObserver<TElement> definition,
    string id)
public static Func<T1, IRemoteObserver<TElement>>
DefineObserver<T1, TElement>(
    this IRemoteProvider provider,
    Expression<Func<T1, IObserver<TElement>>> definition)
public static Func<T1, IRemoteObserver<TElement>>
```

-continued

```
GetObserver<T1, TElement>(
    this IRemoteProvider provider,
    string id)
public static Func<T1, IRemoteObserver<TElement>> Deploy<T1, TElement>(
    this Func<T1, IRemoteObserver<TElement>> definition,
    string id)
// ... overloads for up to 16 parameters
```

IStreamable Source

```
public static IQStreamable<TPayload>
DefineStreamable<TPayload>(
    this IRemoteProvider provider,
    Type adapterFactoryType,
    object configInfo,
    EventShape eventShape,
    AdvanceTimeSettings advanceTimeSettings)
public static IQStreamable<TPayload> GetStreamable<TPayload>(
    this IRemoteProvider provider,
    string id)
public static IQStreamable<TPayload> Deploy<TPayload>(
    this IQStreamable<TPayload> definition,
    string id)
public static Func<T1, IQStreamable<TPayload>>
DefineStreamable<T1, TPayload>(
    this IRemoteProvider provider,
    Expression<Func<T1, IQStreamable<TPayload>>> definition)
public static Func<T1, IQStreamable<TPayload>>
GetStreamable<T1, TPayload>(
    this IRemoteProvider provider,
    string id)
public static Func<T1, IQStreamable<TPayload>> Deploy<T1, TPayload>(
    this Func<T1, IQStreamable<TPayload>> definition,
    string id)
// ... overloads for up to 16 parameters
```

Streamable Sink

```
public static IRemoteStreamableSink<TPayload>
DefineStreamableSink<TPayload>(
    this IRemoteProvider provider,
    Type adapterFactoryType,
    object configInfo,
    EventShape eventShape,
    StreamEventOrder streamEventOrder)
public static IRemoteStreamableSink<TPayload>
GetStreamableSink<TPayload>(
    this IRemoteProvider provider,
    string id)
public static IRemoteStreamableSink<TPayload>
Deploy<TPayload>(
    this IRemoteStreamableSink<TPayload> definition,
    string id)
public static Func<T1, IRemoteStreamableSink<TPayload>>
DefineStreamableSink<T1, TPayload>(
    this IRemoteProvider provider,
    Expression<Func<T1, IStreamableSink<TPayload>>> definition)
public static Func<T1, IRemoteStreamableSink<TPayload>>
GetStreamableSink<T1, TPayload>(
    this IRemoteProvider provider,
    string id)
public static Func<T1, IRemoteStreamableSink<TPayload>>
Deploy<T1, TPayload>(
    this Func<T1, IRemoteStreamableSink<TPayload>> definition,
    string id)
```

```
{
    return DeployDelegate(definition, id).GetStreamableSink<T1, TPayload>(id);
}
// ... overloads for up to 16 parameters
```

Bindings occur in the client only. Running a binding results in a process. Subjects are named and created in one single step:

Bindings and Process

A binding is a composed unit that can be deployed to create a process.

```
public static IRemoteBinding Bind<TElement>(
    this IQbservable<TElement> source,
    IRemoteObserver<TElement> sink)
public static IRemoteStreamableBinding Bind<TPayload>(
    this IQStreamable<TPayload> source,
    IRemoteStreamableSink<TPayload> sink)
public interface IRemoteBinding : IRemote
{
    IDisposable Run(string id);
}
```

In the example illustrated above, the disposable returned from the Run ( )method in a binding is a process.

Subject

```
public static IRemoteSubject<TSource, TResult>
GetSubject<TSource, TResult>(
    this IRemoteProvider provider,
    string id)
public static IRemoteSubject<TSource, TResult>
CreateSubject<TSource, TResult>(
    this IRemoteProvider provider,
    string id,
    Expression<Func<ISubject<TSource, TResult>>> definition)
```

Seams support transitions between three semantic domains:
Temporal streams (IStreamable)
Pull sequences (IEnumerable)
Push sequences (IObservable)
In the illustrated examples, seam operators start with the word "To". The source domain is represented only via the type of the argument, not redundantly through the operator name.

| | Destination | | |
| --- | --- | --- | --- |
| Origin | IStreamable | IEnumerable | IObservable |
| IStreamable | | ToEnumerable( ) | ToObservable( ) |
| IEnumerable | ToStreamable( ) | | ToObservable( ) |
| IObservable | ToStreamable( ) | ToEnumerable( ) | |

The client remote provider is responsible for the construction of composite expression trees—expression trees spanning Reactive.NET, StreamInsight, LINQ to Objects and other LINQ domains—via operator combinator methods. Until the expression tree is serialized, the provider mirrors the behavior of any other LINQ provider. When serialization is required—because logic is being sent to the StreamInsight server—some transformations are needed. The goal of these transformations is to "unfold" the expression tree and represent it as a function of the remote provider (so that the function can be applied to the engine remote provider).

The following now illustrates various phases that can be performed.

In a first phase, references to local variables are evaluated. For instance, in the following example:

```
var hopSize = TimeSpan.fromMinutes(10);
var defn = from x in xs
    group x by x.A into gs
    from win in gs.TumblingWindow(hopSize)
    select win.Count( );
```

The hopSize variable appears as an expression of the form: Member(Constant(< >_c), "hopSize") where the constant represents the closure environment. The client provider specifically recognizes and evaluates member access over closure environment values, where closure environments are identified based on naming conventions for the compiler-generated closure types. Evaluation eliminates opaque "shared state" from the computation by locking down a specific value. In theory, this can cause differences in semantics between the original and serialized expression. In practice, the absence of support for assignment expressions and the conventions of the data query component query authoring prevent confusion. When a closure expression is evaluated, it is replaced with a constant expression. For instance, in the above example the expression Member (Constant(< >_c), "hopSize") is replaced with Constant (TimeSpan).

In a second phase, as a result of closure evaluation, the expression tree may contain a constant expression where the value itself wraps an expression. For instance, in the following example:

```
var js = provider.DefineObservable(( ) => Observable.Range(0, 10));
var defn = from i in provider.DefineObservable(( ) =>
Observable.Range(0, 10))
    from j in js
    select i * j;
```

"js" is itself described by an expression tree because it implements the IQbservable< > contract. In such cases, the expression needs to be expanded and processed (in case those expression trees also contain closure references). The definition (defn) is rewritten as:

```
from i in provider.DefineObservable(( ) => Observable.Range(0, 10))
from j in provider.DefineObservable(( ) => Observable.Range(0, 10))
select i * j;
```

In a third phase, references to the provider are replaced with the provider argument. The above example is ultimately rewritten as:

```
(IRemoteProvider p) =>   from i in p.Range(0, 10)
                         from j in p.Range(0, 10)
                         select i * j
```

The following illustrates details about expression rewriting using a technology specific example. The CEDR LINQ dialect implements implicit multicast in which repeated references to operators result in the creation of an engine multicast operation. As a result, operations are performed to preserve expression references when serializing and deserializing expression DAGs. References are preserved as now described.

During deserialization, the expression DAG is walked to count the number of parents for each expression. Parameter reference expressions are omitted because they (by definition) have 0-to-many parents.

For each expression with >1 parents, the subsequent pass determines the number of "open" parameters in the common sub-expression. Open parameters are identified by walking the common expression tree and gathering all parameter reference expressions that are not in scope via a lambda expression parameter declaration. For instance, in the expression $x=>x+y$, the y parameter is an open parameter while the reference to x is ignored.

The naive implementation of the above strategy could be inefficient because of nesting of common expressions. To ensure that the expression DAG is traversed only once, open parameter identification is performed bottom up and open parameter sets are cached for common expressions. Cached open parameter data is thus available for all nested common expressions. When a previously examined sub-expression is encountered, only the cached open parameter references are of interest, which prevents exhaustive re-examination of the sub-expression. Consider the following common expression which nests the above example.

$$y=>(x=>x+y)(1)+(x=>x+y)(2)$$

The only parameter reference that is interesting in the above example is y, as by definition any other parameter references are closed.

In the next pass, expressions with multiple parents are replaced with invocations of parameter references, where the invocation arguments are the open parameters in the common expression. For instance, the common expression $x=>x+y$ is replaced with p1(y). In a side table, the definitiond1 of p1 is maintained: $y=>x=>x+y$. The side table is populated bottom up so that nested common expression dependencies can be honored. In the above example, the outer common expression $y=>(x=>x+y)(1)+(x=>x+y)(2)$ is replaced with a parameter invocation p2( )—there are no open parameters—and the side table includes the definition d2 of p2 is: $( )=>y=>p1(y)(1)+p1(y)(2)$.

Common expression parameter references and common expression definitions are bound through invocation of lambda expressions. The rewritten body produced is wrapped as follows. Note that the resulting expression tree is semantically equivalent to the graph passed as input to the serializer:

$$(p1=>( \ldots (pn=>\text{body})(dn) \ldots )(d1)$$

For instance, assuming the entire input DAG is:

$$(y=>(x=>x+y)(1)+(x=>x+y)(2))(3)+(y=>(x=>x+y)(1)+(x=>x+y)(2))(4)$$

The output of operations where expressions with multiple parents are replaced with invocations of parameter references is:

$p2( )(3)+p2( )(4)$ with $d1$ defined as $y=>x+y$ and $d2$ defined as $0=>y=>p1(y)(1)+p1(y)(2)$ and the expanded form is:

```
(p1 =>
  (p2 =>
    p2( )(3) + p2( )(4)
  )(( ) => y => p1(y)(1) + p1(y)(2))
)(y => x + y)
```

After deserialization of the tree that is the output when common expression parameter references and common expression definitions are bound through invocation of lambda expressions, the original DAG is recovered by recognizing patterns of invocations produced by the acts described above. The expression tree is walked top-down. When a "declaration" invocation (as produced when common expression parameter references and common expression definitions are bound through invocation of lambda expressions) is encountered, a map from parameter to definition is produced.

When an "expansion" invocation is encountered (as produced when expressions with multiple parents are replaced with invocations of parameter references), the open parameters in the definition are replaced with those that are arguments to the expansion invocation. The definition with replacements is then dropped in place of the expansion invocation. A dictionary is maintained that maps from "definition+invocation parameters" to "definition with parameters replaced". The dictionary is used to determine if an existing expression reference should be used for a particular expansion.

During the traversal of the body of the declaration invocation, the algorithm tracks whether all references to the declaration parameter have been successfully expanded. If so, the expanded body can be dropped in place of the declaration invocation. Otherwise, the invocation expression remains.

Care has been taken to ensure that transformations of the expression are semantic preserving. There exist (benign) false positives and false negatives in common expression identification during serialization. In particular, the original expression tree may reuse parameter declaration instances across distinct lambda expressions. In such cases, the serialization algorithm may recognize a common expression but during deserialization distinct parameter declarations exist. As a result, the common expression gets split to account for the different parameter references. This is an acceptable false negative, because, in the illustrated example, such expressions can only be constructed by hand (they will not be constructed by the compiler) and the two instances of the "common" expression are in fact different because they refer to different parameters—or, more strictly, to the same parameter declaration reference used in different contexts.

The original expression tree may include patterns of invocations that match the "declaration" and "expansion" patterns produced by the serializer. As with the false negative described above, this false positive is triggered only by hand-constructed expressions. The expanded form is also semantically equivalent but only if one assumes no side-effects of expression evaluation.

Embodiments may implement an entity manager. The entity (or constituent) manager is responsible for hoisting query logic within an application on the server. In some embodiments, there is one constituent manager for every application. The constituent manager interacts with a metadata provider to store and retrieve the serialized form of expressions representing the logic. Constituents come in several variants. One variant includes sources and sinks that represent logic. When these constituents are instantiated, they create an IObservable, IEnumerable, StreamInsightQuery, IObservableSink or IenumerableSink (or the equivalent in other platforms). Another variant includes subjects. These artifacts have a lifetime independent of any subscriptions or activations. Which leads to the next variant which is subscriptions or activation. The act of hooking up a producer to a subject or requesting that a sink consume from a source, is represented as a function call that triggers the subscription. Each of these artifact variants are represented by some identifier.

Indicating that constituents are represented as logic means that they are expressions that when compiled are functions that when invoked, will create running artifacts. The last two types of constituents will be invoked at the time that the logic is materialized into a delegate. The constituent manager will maintain a map from constituent identifiers to either delegates that represent the materialized logic or in the case of subject and subscriptions, the actual entities returned from invoking the logic.

The first task in hoisting the logic is rewriting the expression tree to use server side artifacts. The delegate that is compiled will take an instance of the ConstituentManagerLinqProvider. This is the server side version of IHybridProvider that allows embodiments to hook into the each of the seams and will allow embodiments to carry context used for building the diagnostic hooks.

Some embodiments may be configured to implement rewrite to enable instrumentation. The rewrite process also modifies all references from ProviderExtensions to ConstituentManagerProviderExtensions. The return types are changed to the hot versions (IQueryable→IEnumerable, IQbservable→IObservable). The extension methods in ConstituentManagerProviderExtensions are also the points or the seams where embodiments can add instrumentation for the activation tree that is being materialized. For example, when going from a Rx query to StreamInsight query, embodiments will use the ToStream (or variant) gestures. These methods are explicit seams that embodiments will surface in the diagnostics.

Some embodiments utilize XML serialization via DataContract to implement the embodiments. Private, immutable classes use data contract attributes to describe the serialization and deserialization. Each class "serializes" in its constructor, which takes a SerializationContext argument. The serialization context manages types and parameter scopes for lambda expressions. Each class has a "Deserialize" method which takes a DeserializationContext argument, which as with the serialization context manages lambda expression scopes and types.

Subject to the exceptions listed below, expression serialization is a verbatim interpretation of the data query component expression API. Wherever an expression factory method takes a value, that value is serialized. The most specific overloads for expression factory methods are represented to ensure that all information is preserved.

Parameters in the data query component have "identity by reference". In the serialized form, embodiments maintain the object references by leveraging a ParameterDecl (name—possibly null, type and ID—which correspond to the order of the parameter) and ParameterRef, which merely refers to the ID. During serialization, lambda expressions contain parameter declarations, and their bodies contain parameter references. Dangling parameters are not supported.

For compactness, types are also represented as references. The root of the serialized expression includes a list of type definitions with their corresponding identifiers. Within the expression body, type are referenced by id.

Some embodiments may have limited expression support. For example, in some embodiments, only true expressions are supported for serialization, while other expressions, such as statement expressions (such as block expressions) may not be supported.

Whenever the expression type can be deterministically recovered, some embodiments may not serialize it. Cases where the type cannot (necessarily) be deterministically recovered include:

LambdaExpression: co/contra-variance support can result in quoted lambda expressions with the 'wrong' types for overload resolution.

ConstantExpression: a constant value may have a more specific type than its containing constant expression.

ConditionalExpression: while C# requires agreement between IfTrue and IfFalse,

StreamInsight implements implicit multicast in its LINQ surface by recognizing common references. As a result, serialization is designed to be graph aware.

The following discussion now refers to a number of methods and method acts that may be performed. Although the method acts may be discussed in a certain order or illustrated in a flow chart as occurring in a particular order, no particular ordering is required unless specifically stated, or required because an act is dependent on another act being completed prior to the act being performed.

Figure 10:
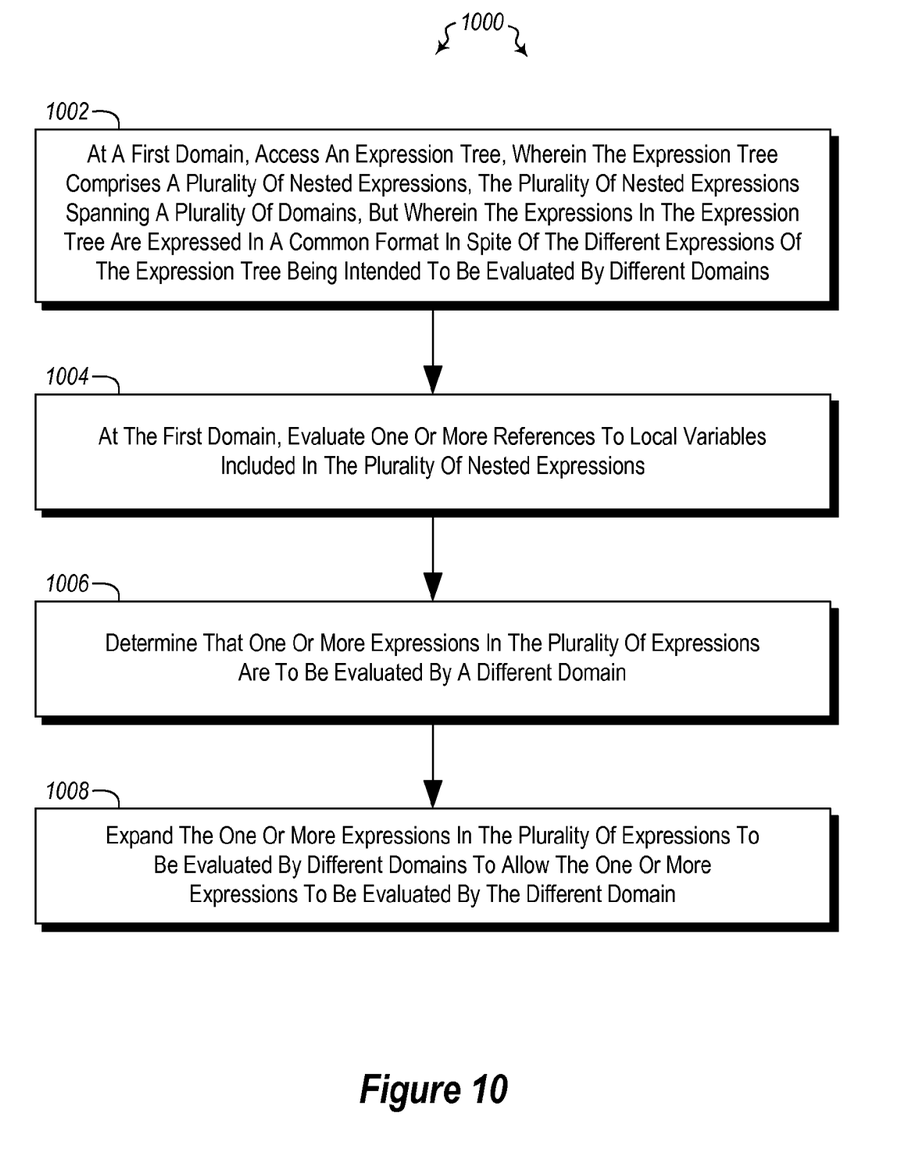
FIG. 10 illustrates a method of evaluating an expression tree.

Referring now to FIG. 10, a method 1000 is illustrated. The method 1000 includes acts for evaluating an expression tree. The method includes, at a first domain, accessing an expression tree (act 1002). The expression tree includes a plurality of nested expressions. The plurality of nested expressions span a plurality of domains. However, the expressions in the expression tree are expressed in a common format in spite of the different expressions of the expression tree being intended to be evaluated by different domains. For example, a client computing system in a distributed system may access an expression tree. The expression tree may be expressed in a uniform way such that it appears to be completely able to be evaluated by the first domain. However, the expression tree may in fact, include expressions that are intended to be evaluated by other domains, such as other providers, data sources, etc. As will be illustrated, the expressions, though expressed in a uniform way, can be expanded to a format appropriate for the dialect of the domains on which they are to be evaluated.

The method 1000 further includes, at the first domain, evaluating one or more references to local variables included in the plurality of nested expressions (act 1004). In particular, expression elements that can be evaluated locally by the first domain are evaluated.

The method 1000 further includes determining that one or more expressions in the plurality of expressions are to be evaluated by a different domain (act 1006). For example, a determination may be made that a representation of a certain sub-expression indicates that the sub-expression is to be evaluated by a different computing system in a distributed environment. For example, in some embodiments, determining that one or more expressions in the plurality of expressions are to be evaluated by a different domain comprises determining that the one or more expressions are expressed in the common format using a particular type. Different types may be used to indicate a domain that should be used to expand and/or evaluate an expression. Alternatively or additionally, determining that one or more expressions in the plurality of expressions are to be evaluated by a different domain may include determining that the one or more expressions are at a particular level of the expression tree. For example, the expression tree may be arranged hierarchically. A determination of a domain may be made according to a numerical level of the expression tree in which an expression sits. Alternatively, a determination of a domain may be made according to an expressions hierarchical relationship with other expressions in the expression tree.

The method 1000 further includes expanding the one or more expressions in the plurality of expressions to be evaluated by different domains to allow the one or more expressions to be evaluated by the different domain (act 1008). As illustrated in the examples above, expressions may be expanded so that they can be evaluated by the domain that they are intended to be evaluated by. In some embodiments, expanding the one or more expressions in the plurality of expressions to be evaluated by different domains comprises using an expansion call internal to the common format. For example, the expression may internally contain all the information needed to expand an expression written in the common format to an expression that can be evaluated by a different domain. In an alternative or additional embodiment, expanding the one or more expressions in the plurality of expressions to be evaluated by different domains comprises providing the one or more expressions to a provider that expands the one or more expressions and returns them to the first domain. Thus, for example, the expression may be provided to a different system that has functionality for expanding the expression.

Embodiments of the method 1000 may be practiced where at least a portion of the domains in the plurality of domains use different dialects.

Embodiments of the method 1000 may be practiced where at least a portion of the domains in the plurality of domains are remote from each other.

Embodiments of the method 1000 may be practiced where at least a portion of the domains in the plurality of domains are servers and the first domain is a client of the servers.

Further, the methods may be practiced by a computer system including one or more processors and computer readable media such as computer memory. In particular, the computer memory may store computer executable instructions that when executed by one or more processors cause various functions to be performed, such as the acts recited in the embodiments.

Embodiments of the present invention may comprise or utilize a special purpose or general-purpose computer including computer hardware, as discussed in greater detail below. Embodiments within the scope of the present invention also include physical and other computer-readable media for carrying or storing computer-executable instructions and/or data structures. Such computer-readable media can be any available media that can be accessed by a general purpose or special purpose computer system. Computer-readable media that store computer-executable instructions are physical storage media. Computer-readable media that carry computer-executable instructions are transmission media. Thus, by way of example, and not limitation, embodiments of the invention can comprise at least two distinctly different kinds of computer-readable media: physical computer readable storage media and transmission computer readable media.

Physical computer readable storage media includes RAM, ROM, EEPROM, CD-ROM or other optical disk storage (such as CDs, DVDs, etc), magnetic disk storage or other magnetic storage devices, or any other medium which can be used to store desired program code means in the form of computer-executable instructions or data structures and which can be accessed by a general purpose or special purpose computer.

A "network" is defined as one or more data links that enable the transport of electronic data between computer systems and/or modules and/or other electronic devices. When information is transferred or provided over a network or another communications connection (either hardwired, wireless, or a combination of hardwired or wireless) to a computer, the computer properly views the connection as a transmission medium. Transmissions media can include a network and/or data links which can be used to carry or desired program code means in the form of computer-executable instructions or data structures and which can be accessed by a general purpose or special purpose computer. Combinations of the above are also included within the scope of computer-readable media.

Further, upon reaching various computer system components, program code means in the form of computer-executable instructions or data structures can be transferred automatically from transmission computer readable media to physical computer readable storage media (or vice versa). For example, computer-executable instructions or data structures received over a network or data link can be buffered in RAM within a network interface module (e.g., a "NIC"), and then eventually transferred to computer system RAM and/or to less volatile computer readable physical storage media at a computer system. Thus, computer readable physical storage media can be included in computer system components that also (or even primarily) utilize transmission media.

Computer-executable instructions comprise, for example, instructions and data which cause a general purpose computer, special purpose computer, or special purpose processing device to perform a certain function or group of functions. The computer executable instructions may be, for example, binaries, intermediate format instructions such as assembly language, or even source code. Although the subject matter has been described in language specific to structural features and/or methodological acts, it is to be understood that the subject matter defined in the appended claims is not necessarily limited to the described features or acts described above. Rather, the described features and acts are disclosed as example forms of implementing the claims.

Those skilled in the art will appreciate that the invention may be practiced in network computing environments with many types of computer system configurations, including, personal computers, desktop computers, laptop computers, message processors, hand-held devices, multi-processor systems, microprocessor-based or programmable consumer electronics, network PCs, minicomputers, mainframe computers, mobile telephones, PDAs, pagers, routers, switches, and the like. The invention may also be practiced in distributed system environments where local and remote computer systems, which are linked (either by hardwired data links, wireless data links, or by a combination of hardwired and wireless data links) through a network, both perform tasks. In a distributed system environment, program modules may be located in both local and remote memory storage devices.

Alternatively, or in addition, the functionally described herein can be performed, at least in part, by one or more hardware logic components. For example, and without limitation, illustrative types of hardware logic components that can be used include Field-programmable Gate Arrays (FPGAs), Program-specific Integrated Circuits (ASICs), Program-specific Standard Products (ASSPs), System-on-a-chip systems (SOCs), Complex Programmable Logic Devices (CPLDs), etc.

The present invention may be embodied in other specific forms without departing from its spirit or characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed is:

1. A method, implemented at a computer system that includes one or more processors, of evaluating an expression tree, the method comprising:
   at a first domain, accessing an expression tree comprising a plurality of nested expressions, the plurality of nested expressions spanning a plurality of domains, and including:
      (i) one or more first nested expressions that are expressed in a first dialect of the first domain in a manner that they are expandable to a second dialect of a second domain for evaluation by the second domain, and
      (ii) one or more second nested expressions that are expressed in the first dialect of the first domain in a manner that they are expandable to a third dialect of a third domain for evaluation by the third domain,
      wherein the first dialect, the second dialect, and the third dialect are each different from each other, and wherein the expression tree contains all information needed to expand the one or more first nested expressions from the first dialect to the second dialect and contains all information needed to expand the one or more second nested expressions from the first dialect to the third dialect;
   determining that the one or more first expressions are to be evaluated by the second domain, and that the one or more second expressions are to be evaluated by the third domain; and
   based at least on determining that the one or more first expressions and the one or more second expressions are to evaluated by the second and third domains, respectively, expanding the one or more first expressions to the second dialect, and expanding the one or more second expressions to the third dialect.

2. The method of claim 1, wherein at least a portion of the domains in the plurality of domains are remote from each other.

3. The method of claim 1, wherein at least a portion of the domains in the plurality of domains are servers and the first domain is a client of the servers.

4. The method of claim 1, wherein determining that the one or more first expressions are to be evaluated by the second domain comprises determining that the one or more first expressions are expressed using a particular type.

5. The method of claim 1, wherein determining that the one or more first expressions are to be evaluated by the second domain comprises determining that the one or more first expressions are at a particular level of the expression tree.

6. The method of claim 1, wherein expanding the one or more first expressions and expanding the one or more second expressions comprises using an expansion call internal to the first dialect.

7. The method of claim 1, wherein determining that the one or more first expressions are to be evaluated by the second domain comprises determining an expression of a hierarchical relationship of the one or more first expressions in the expression tree.

8. The method of claim 1, wherein the first dialect comprises a common format for expressing expressions in a plurality of dialects.

9. A computer system configured to evaluate expression trees, the system comprising:
one or more processors; and
one or more computer readable media, wherein the one or more computer readable media comprise computer executable instructions that are structured such that, when executed by at least one of the one or more processors, the computer executable instructions cause at least one of the one or more processors to perform the following:
at a first domain, access an expression tree comprising a plurality of nested expressions, the plurality of nested expressions spanning a plurality of domains, and including:
(i) one or more first nested expressions that are expressed in a first dialect of the first domain in a manner that they are expandable to a second dialect of a second domain for evaluation by the second domain, and
(ii) one or more second nested expressions that are expressed in the first dialect of the first domain in a manner that they are expandable to a third dialect of a third domain for evaluation by the third domain,
wherein the first dialect, the second dialect, and the third dialect are each different from each other, and wherein the expression tree contains all information needed to expand the one or more first nested expressions from the first dialect to the second dialect and contains all information needed to expand the one or more second nested expressions from the first dialect to the third dialect;
determine that the one or more first expressions are to be evaluated by the second domain, and that the one or more second expressions are to be evaluated by the third domain; and
based at least on determining that the one or more first expressions and the one or more second expressions are to evaluated by the second and third domains, respectively, expand the one or more first expressions to the second dialect, and expand the one or more second expressions to the third dialect.

10. The computer system of claim 9, wherein at least a portion of the domains in the plurality of domains are remote from each other.

11. The computer system of claim 9, wherein at least a portion of the domains in the plurality of domains are servers and the first domain is a client of the servers.

12. The computer system of claim 9, wherein determining that the one or more first expressions are to be evaluated by the second domain comprises determining that the one or more first expressions are expressed using a particular type.

13. The computer system of claim 9, wherein determining that the one or more first expressions are to be evaluated by the second domain comprises determining that the one or more first expressions are at a particular level of the expression tree.

14. The computer system of claim 9, wherein expanding the one or more first expressions and expanding the one or more second expressions comprises using an expansion call internal to the first dialect.

15. The computer system of claim 9, wherein determining that the one or more first expressions are to be evaluated by the second domain comprises determining an expression of a hierarchical relationship of the one or more first expressions in the expression tree.

16. The computer system of claim 9, wherein the first dialect comprises a common format for expressing expressions in a plurality of dialects.

17. The computer system of claim 9, wherein the computer executable instructions include instructions that cause at least one of the one or more processors to evaluate one or more references to local variables included in the plurality of nested expressions.

18. A computer program product comprising one or more hardware computer memories having stored thereon computer executable instructions that are structured such that, when executed by at least one or more processors, the computer executable instructions cause at least one of the one or more processors to perform the following:
at a first domain, the first domain configured to request and receive data using a first dialect, access an expression tree comprising a plurality of nested expressions, the plurality of nested expressions spanning a plurality of domains and including:
(i) one or more first nested expressions that are expressed in the first dialect in a manner that they are expandable to a second dialect of a second domain for evaluation by the second domain, and
(ii) one or more second nested expressions that are expressed in the first dialect in a manner that they are expandable to a third dialect of a third domain for evaluation by the third domain,
wherein the first dialect, the second dialect, and the third dialect are each different from each other, and wherein the expression tree contains all information needed to expand the one or more first nested expressions from the first dialect to the second dialect and contains all information needed to expand the one or more second nested expressions from the first dialect to the third dialect;
determine that the one or more first expressions are to be evaluated by the second domain, and that the one or more second expressions are to be evaluated by the third domain; and
based at least on determining that the one or more first expressions and the one or more second expressions are to evaluated by the second and third domains, respectively, expand the one or more first expressions to the second dialect, and expand the one or more second expressions to the third dialect.

19. The computer program product of claim 18, wherein at least a portion of the domains in the plurality of domains are servers and the first domain is a client of the servers.

20. The computer program product of claim 18, wherein expanding the one or more first expressions to be evaluated by the second comprises using an expansion call internal to the common format.

* * * * *